United States Patent
Zicker et al.

(10) Patent No.: US 6,453,178 B1
(45) Date of Patent: *Sep. 17, 2002

(54) RADIOTELEPHONE OPERATING METHOD WITH CONNECTED NPA DIALING ANALYSIS

(75) Inventors: Robert G. Zicker, Roswell, GA (US); John K. Dion, Roswell, GA (US)

(73) Assignee: GTE Wireless Service Corporation, Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/714,379

(22) Filed: Nov. 16, 2000

Related U.S. Application Data (63) Continuation of application No. 09/324,818, filed on Jun. 2, 1999, which is a continuation of application No. 08/642,237, filed on May 2, 1996, now Pat. No. 6,021,335, which is a continuation of application No. 08/315,014, filed on Sep. 29, 1994, now Pat. No. 5,535,260, which is a continuation-in-part of application No. 08/201,445, filed on Feb. 24, 1994, now Pat. No. 5,594,782.

(51) Int. Cl.[7] .................................................. H04B 1/38
(52) U.S. Cl. ........................ 455/564; 455/419; 455/550; 379/355.01
(58) Field of Search ............................... 455/564, 33.1, 455/565, 33.2, 522, 550, 418, 419, 414; 379/63, 355.01, 354

(56) References Cited

U.S. PATENT DOCUMENTS

| | | | |
|---|---|---|---|
| 3,912,875 A | 10/1975 | Katz | 179/41 |
| 4,122,304 A | 10/1978 | Mallien, II | 179/2 |
| 4,658,096 A | 4/1987 | West, Jr. et al. | 379/59 |
| 4,659,878 A | 4/1987 | Dinkins | 370/71 |
| 4,718,080 A | 1/1988 | Serrano et al. | 379/63 |
| 4,737,975 A | 4/1988 | Shafer | 379/58 |
| 4,748,655 A | 5/1988 | Thrower et al. | 379/60 |
| 4,768,218 A | 8/1988 | Yorita | 379/63 |
| 4,768,220 A | 8/1988 | Yoshihara et al. | 379/63 |
| 4,775,997 A | 10/1988 | West, Jr. et al. | 379/58 |
| 4,790,000 A | 12/1988 | Kinoshita | 379/59 |
| 4,802,235 A | 1/1989 | Treatch | 455/76 |
| 4,811,420 A | 3/1989 | Avis et al. | 455/51 |
| 4,826,421 A | 5/1989 | Dawano et al. | 370/95.1 |
| 4,850,033 A | 7/1989 | Eizenhofer et al. | 455/56 |
| 4,881,271 A | 11/1989 | Yamauchi et al. | 455/56 |
| 4,922,517 A | 5/1990 | West, Jr. et al. | 379/58 |
| 4,939,766 A | 7/1990 | Umemoto et al. | 379/58 |
| 4,959,851 A | 9/1990 | Tobolski, Jr. et al. | 379/59 |
| 4,972,455 A | 11/1990 | Phillips et al. | 379/59 |
| 4,989,230 A | 1/1991 | Gillig et al. | 379/59 |
| 5,008,925 A | 4/1991 | Pireh | 379/60 |
| 5,020,091 A | 5/1991 | Krolopp et al. | 379/57 |
| 5,020,092 A | 5/1991 | Phillips et al. | 379/59 |
| 5,020,093 A | 5/1991 | Pireh | 379/59 |
| 5,046,082 A | 9/1991 | Zicker et al. | 370/59 |
| 5,046,085 A | 9/1991 | Godsey et al. | 379/112 |

(List continued on next page.)

*Primary Examiner*—Edward F. Urban
*Assistant Examiner*—Tilahun Gesesse
(74) *Attorney, Agent, or Firm*—James K. Weixel (57) ABSTRACT

A radiotelephone (10) simulates the call origination process performed by land-line telephones. Dial tone is generated (78) in response to an off-hook condition and removed when a first digit (54) is dialed. A timer process (84, 110) and a number analysis process (100) simultaneously evaluate dialed digits to detect the completion of dialing. The number analysis process (100) identifies seven, ten, and eleven digit, and indeterminate length phone number formats (64, 66, 52, 68). The ten digit format is recognized in response to remotely programmed (42) connected NPA codes. For most calls, the number analysis process (100) instantly detects a phone number's final digit (62). In a few cases the timer process (84, 110) detects the final digit through the absence of dialing activity for a predetermined duration. When the final digit (62) is detected, an origination message is transmitted to a cellular network.

10 Claims, 5 Drawing Sheets

U.S. PATENT DOCUMENTS

| | | | |
|---|---|---|---|
| 5,093,925 A | | 3/1992 | Chanroo ........................ 455/33 |
| 5,117,450 A | * | 5/1992 | Joglekar et al. ............... 379/58 |
| 5,127,042 A | | 6/1992 | Gillig ............................ 379/59 |
| 5,131,029 A | | 7/1992 | Kunstadt ..................... 379/355 |
| 5,146,486 A | | 9/1992 | Lebowitz ...................... 379/40 |
| 5,148,548 A | | 9/1992 | Meche et al. ............... 455/34.1 |
| 5,153,904 A | | 10/1992 | Coombes et al. ............. 379/58 |
| 5,157,719 A | | 10/1992 | Waldman ..................... 379/356 |
| 5,159,625 A | | 10/1992 | Zicker .......................... 379/59 |
| 5,175,872 A | | 12/1992 | Borras .......................... 455/76 |
| 5,179,721 A | | 1/1993 | Comroe et al. ............. 455/33.1 |
| 5,203,012 A | | 4/1993 | Patsiokas et al. ........... 455/33.1 |
| 5,208,847 A | | 5/1993 | Allen ........................... 379/59 |
| 5,247,565 A | * | 9/1993 | Joglekar et al. ............. 379/355 |
| 5,274,693 A | * | 12/1993 | Waldman ..................... 379/354 |
| 5,276,729 A | * | 1/1994 | Higuchi et al. .............. 379/356 |
| 5,305,372 A | * | 4/1994 | Tomiyori ..................... 455/33.1 |
| 5,402,481 A | * | 3/1995 | Waldman ..................... 379/354 |
| 5,422,945 A | | 6/1995 | Wyatt .......................... 379/283 |
| 5,509,056 A | | 4/1996 | Ericsson et al. ............. 379/144 |
| 5,535,260 A | | 7/1996 | Zicker et al. .................. 379/63 |
| 5,550,907 A | * | 8/1996 | Carlsen ......................... 379/207 |
| 5,563,931 A | * | 10/1996 | Bishop et al. .............. 455/33.1 |
| 5,594,782 A | | 1/1997 | Zicker et al. .................. 379/63 |
| 5,722,087 A | | 2/1998 | Ala-Mursula et al. ....... 455/564 |
| 5,963,875 A | | 10/1999 | Go .............................. 455/564 |
| 6,021,335 A | | 2/2000 | Zicker et al. ................ 455/564 |

* cited by examiner

RADIOTELEPHONE OPERATING METHOD WITH CONNECTED NPA DIALING ANALYSIS

RELATED APPLICATIONS

The present invention is a continuation of "Portable Cellular Telephone With Automatically Transmitted Origination Message And Method Therefor," Ser. No. 09/324,818, Filed Jun. 2, 1999, which is a continuation of "Cellular Radiotelephone With Dialed Number Analysis," Ser. No. 08/642,237, filed May 2, 1996, and issued as U.S. Pat. No. 6,021,335, which is a continuation of "Cellular Radiotelephone With Dialed Number Analysis," Ser. No. 08/315,014, filed Sep. 29, 1994, and issued as U.S. Pat. No. 5,535,260, which is a continuation-in-part of "Multiple Mode Personal Wireless Communications System," Ser. No. 08/201,445, filed Feb. 24, 1994 and issued as U.S. Pat. No. 5,594,782, each of which are incorporated herein by reference.

TECHNICAL FIELD OF THE INVENTION

The present invention relates generally to cellular radiotelephones. More specifically, the present invention relates to the origination of calls from cellular radiotelephones.

BACKGROUND OF THE INVENTION

The telephony industry has long used certain standards in managing the processes which occur when land-line telephones are used to make out-going calls. Generally, when a telephone goes off-hook, a circuit is established between the telephone and a central office. The central office typically includes complex, sophisticated, and expensive equipment which provide the intelligence to manage the call origination process. The central office applies dial tone to the telephone's local loop as soon as the off-hook condition is detected. Dial tone provides audible feedback which informs the user that the system is waiting for the user's input. After a first digit is dialed, the central office removes the dial tone.

As the user continues to dial digits, the central office analyzes the digits in order to determine routing and call charges and to identify when an entire phone number has been dialed. This analysis is a complex task because a wide variety of call types may be originated at the telephone. For example, local calls, non-toll inter NPA calls, toll calls, operator assisted calls, international calls, and other types of calls must be distinguished from one another, and the different types of calls may require the dialing of different lengths of digit streams. In areas where central offices in different area codes or LATAs reside near one another, hundreds of central office codes must be distinguished from hundreds of other central office codes. Moreover, these complex rules for dialed number analysis differ from central office to central office so that each central office essentially implements its own unique number analysis plan.

Cellular telephony has adopted a slightly different technique for originating calls. Generally, a user manipulates a handset to store dialed digits in a digit buffer memory located at a cellular radiotelephone. When the user has entered a complete number in the digit buffer, the user presses a "send" key, which signals a conventional radiotelephone to send an origination message to the network. The network then analyzes the digits in a manner similar to that done for land-line telephones. This technique conserves the RF spectrum because the network does not allocate the scarce resource of an RF channel to the radiotelephone at the instant an off-hook condition occurs, but waits until after the user presses the send key.

On the other hand, the conventional cellular telephony call origination technique causes several problems. For example, this technique is different from the widely understood and ubiquitous land-line telephony call origination process. The difference causes numerous complications. New cellular customers must be taught a call origination process that is different from one with which they are usually familiar, and a large cost is associated with teaching a new process to an entire population of users. For many users, the use of a different call origination process causes confusion, which ultimately leads to dissatisfaction. No audible feedback, such as the well known dial tone, is provided to let users know that their instrument is awaiting user input, and many users who are accustomed to the land-line telephony call origination process often become distracted by the lack of this feedback. In addition, the cellular call origination process requires the extra step of pressing the send key. This extra step seems unnatural and is easily forgotten by new users who are accustomed to the land-line telephony call origination process.

Various prior art cellular telephony devices have attempted to make the cellular call origination process more closely resemble the corresponding land-line process. For example, a few prior art cellular devices have generated a dial tone at the radiotelephone itself to provide the familiar feedback. However, these devices have been encumbered by additional switches and related mechanisms that establish on-hook and off-hook conditions and that generally limit the devices' portability and flexibility.

In addition, various prior art cellular telephony devices have attempted to detect when a user completes the dialing activity so that the device may then automatically send an origination message to the cellular network without requiring a user to press a send key. These prior art cellular devices usually wait until no additional key presses are detected at a keypad for a predetermined duration before automatically sending the origination message to the network. Unfortunately, for this technique to be reliable the waiting duration needs to be around three to eight seconds, which is an undesirably long and annoying wait to impose upon users.

Still other devices have attempted to interface between land-line telephone devices and conventional cellular radiotelephones. Such devices have attempted to simulate the operation of a central office insofar as supplying conventional central-office signals to the land-line telephone devices and in evaluating land-line telephone touch tone/rotary dial type signals to determine when a last digit has been dialed. However, such devices are hard-wired or otherwise permanently programmed to simulate a particular's central office's local dialing plan, have only a limited ability to automatically detect the completion of dialing, and are intended only for stationary use at a location covered by the central office whose local dialing plan is being simulated.

SUMMARY OF THE INVENTION

Accordingly, it is an advantage of the present invention that an improved cellular radiotelephone accommodates a call origination process that more closely approximates the land-line call origination process.

Another advantage of the present invention is that a cellular radiotelephone is provided which analyzes digits dialed at the radiotelephone to rapidly determine when a user completes the dialing activity.

Another advantage is that the present invention provides a dial tone for audible feedback and quickly detects the completion of the dialing activity for a vast majority of outgoing calls.

Another advantage is that the present invention may be configured as a mobile or portable unit which may be used in any location, may be manufactured, inventoried, and distributed without any particular area-of-use distinction, and performs a dialed number completion analysis process which is particularly pertinent to one particular area of use while simultaneously performing another dialed number completion process which applies in any area.

The above and other advantages of the present invention are carried out in one form by a method of operating a cellular radiotelephone to originate a call. The method calls for identifying the entry of earlier and later dialed digits where the earlier digit is dialed before the later digit. In response to the earlier digit, the method determines whether the later digit is a final digit of a phone number. When the later digit is the final digit of the phone number, an origination message is automatically transmitted from the radiotelephone. The origination message conveys the phone number to a cellular telecommunication network.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
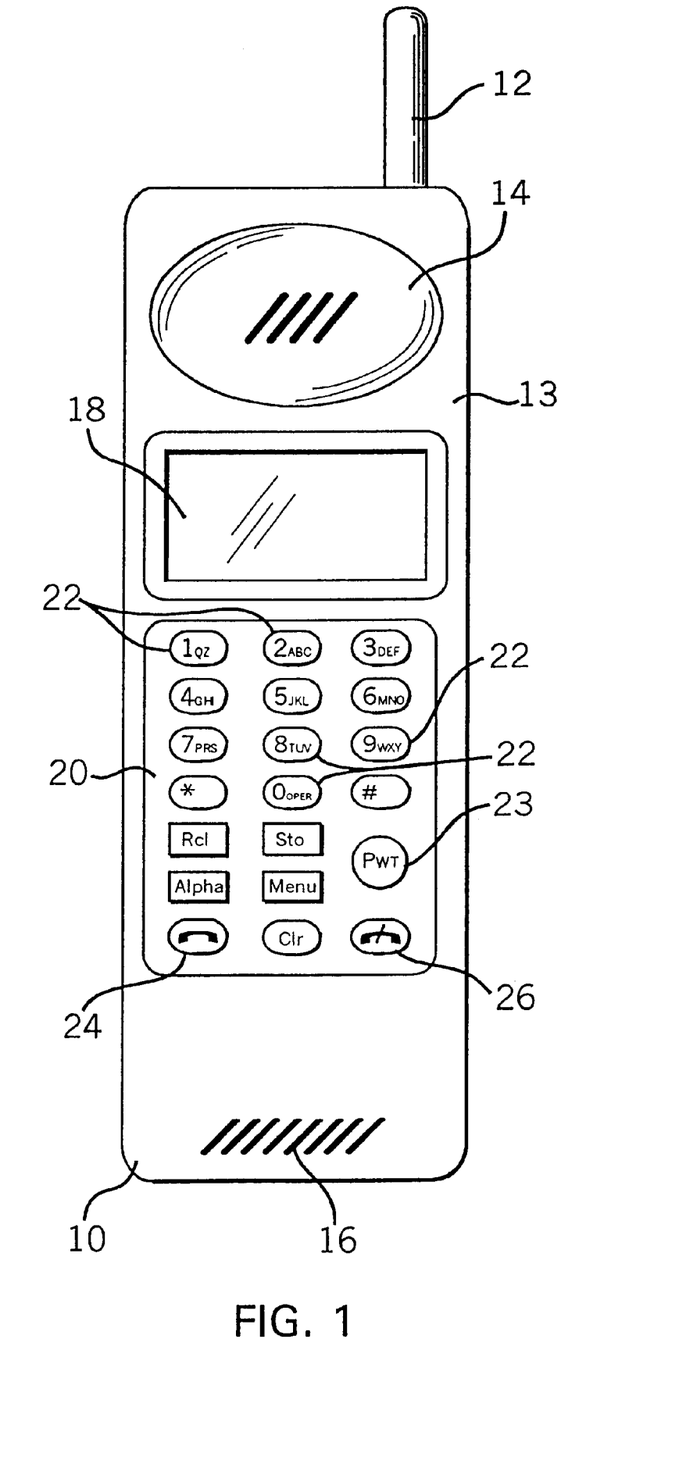
FIG. 1 shows a front view of a portable radiotelephone handset, which represents one of various types of cellular radiotelephones in which the present invention may be implemented.

FIG. 1 shows a front view of a portable radiotelephone handset 10, which represents one of various types of cellular radiotelephones in which the present invention may be implemented. While the present invention may be implemented in any type of radiotelephone, its advantages may be particularly beneficial in connection with portable and mobile radiotelephones. Handset 10 includes an antenna 12, outer case 13, speaker 14, microphone 16, display 18, and keypad 20. With the exception of keypad 20, these items are conventionally found in cellular telephony handsets. Keypad 20 includes many of the usual numeric keys 22 and non-numeric keys 23 conventionally found in cellular telephony handsets. However, keypad 20 omits a "send" key.

Instead of a send key, handset 10 includes a "phone" key 24 and an "end phone" key 26. Phone key 24 initiates dial tone for making calls, may be pressed to receive calls, and may be used to activate a flash hook signal for services such as call waiting. Thus, phone key 24 conveys an "off-hook" instruction to handset 10. End phone key 26 is used to end calls, and thus conveys an "on-hook" instruction to handset 10. Those skilled in the art will appreciate that the terms on-hook and off-hook have a historical significance in connection with land-line telephony systems that may not precisely describe cellular telephony operation. Nevertheless, for purposes of the present invention an off-hook function or condition generally means that a user desires to use handset 10 and the communication services provided thereby, and an on-hook function or condition generally means that a user desires to cease using handset 10 and the services provided thereby.

Figure 2:
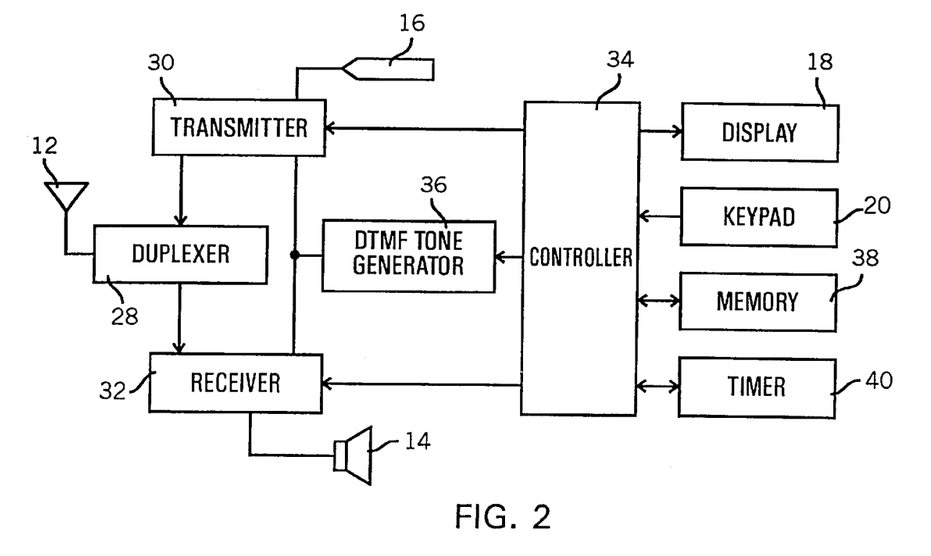
FIG. 2 shows a block diagram of the handset's electronic hardware.

FIG. 2 shows a block diagram of electronic hardware included in handset 10. Antenna 12 of handset 10 couples to a first port of a duplexer 28, while a second port of duplexer 28 is adapted to receive a modulated RF signal provided by a transmitter 30 and a third port of duplexer 28 provides a received RF signal to an input of a receiver 32. An output from receiver 32 couples to speaker 14, and an input of transmitter 30 couples to microphone 16.

A controller 34 controls the operation of handset 10. Controller 34 may be implemented using one or more commercially available microprocessors. Controller 34 provides controlling signals to transmitter 30 and to receiver 32. In the preferred embodiment, these controlling signals enable/disable, and they identify frequency channels to which transmitter 30 and receiver 32 are instructed to tune. In alternate embodiments, the channel instructions may additionally or alternatively convey TDMA timing slots and/or CDMA spreading codes. In addition, these controlling signals identify audio channels from which signals are to be received at transmitter 30 and at receiver 32.

A dual tone multifrequency (DTMF) tone generator 36 has a control input adapted to receive controlling signals provided by controller 34. An audio output of DTMF tone generator 36 couples to audio inputs of transmitter 30 and of receiver 32. Thus, controller 34 may instruct transmitter 30 to transmit DTMF tones or audio from microphone 16, and controller 34 may instruct receiver 32 to drive speaker 14 using received signals or DTMF tones. Of course, handset 10 may also transmit and receive data, such as a 10 Kbit Manchester code which is conventionally used in cellular networks that follow an AMPs standard.

Display 18 couples to controller 34 and visually shows information provided thereto by controller 34. Keypad 20 couples to controller 34 so that controller 34 may detect key presses and then appropriately respond to the key presses. A memory 38 couples to controller 34. Memory 38 includes both volatile and non-volatile storage. Memory 38 stores data, variables, tables, lists, and databases that are used in connection with the operation of handset 10. In addition, memory 38 stores programming instructions which are executed by controller 34 and define the various processes, procedures, routines, tasks, and the like performed by controller 34 and handset 10. A timer 40 couples to controller 34 and helps controller 34 monitor the passage of time. While FIG. 2 shows memory 38 and timer 40 as being separate components from controller 34, those skilled in the art will appreciate that in some applications memory and timing components may be included within controller 34, and that in other applications the timing functions may be performed through the execution of software programming instructions.

Figure 3:
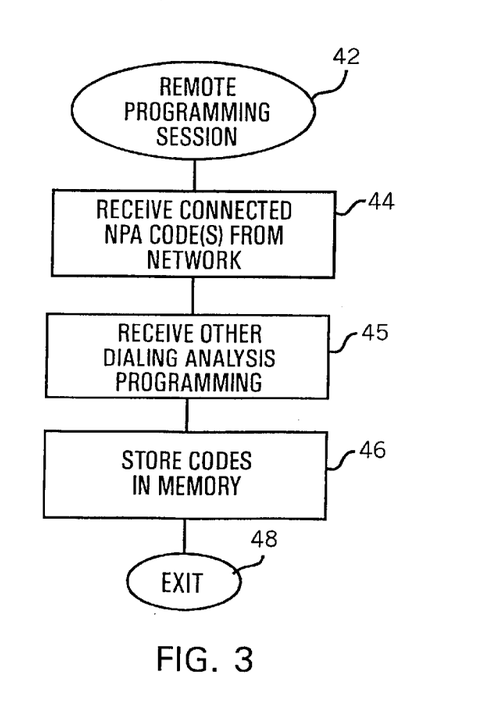
FIG. 3 shows a flow chart of a remote programming session process performed by the handset.

FIG. 3 shows a flow chart of a remote programming session process 42 performed by handset 10. Process 42 is performed during a remote programming session. The particular events which lead to the performance of remote programming session 42 are not critical to the present invention. Such events may, for example, result from handset 10 receiving a call or otherwise establishing a data communication link with a cellular network or through the cellular network to another device which also couples to the cellular network or a public switched telecommunications network (PSTN) to which the cellular network couples. Alternatively, a remote programming session may be established when handset 10 places a call through a cellular network to some phone number or otherwise establishes a data communication path. After a remote programming session call or other data communication path is established into or through the cellular network, a remote programming session may then begin.

Generally, data may be passed to handset 10 through the data communication path. As indicated in a task 44, handset 10 receives one or more "connected" numbering plan area (NPA) codes from the cellular network. The connected NPA codes have a relationship or connection, which is discussed below in more detail, to the area code or codes belonging to the handset's home system. After receiving the connected NPA codes, a optional task 45 is performed to receive other programming which may be relevant to dialing analysis. Such programming may, but need not, indicate whether handset 10 is configured to operate through a PBX and must therefore recognize access codes, and/or programming instructions that define unusual or revised local dialing rules in effect for a particular situation. After task 45, a task 46 stores the codes and any other programming data in memory 38 (see FIG. 2) for later use in connection with a number analysis process, which is discussed below. After task 46, session 42 may receive and transfer any other data as may be advantageous for the session, and program control eventually causes session 42 to end, as indicated by exit 48.

Through remote programming session 42, handset 10 may obtain programming that is specifically designed for particular local dialing rules. Remote programming session 42 may be performed at initial activation, when local dialing rules change, or when a user moves his or her service to a new location. In addition, remote programming session 42 may be performed at any location. Thus, such programming may be accomplished without requiring a user to visit a service center and without requiring service representatives to visit any particular place of use. Entire populations of handsets 10 may all be reprogrammed, as may become necessary when local dialing rules change, at minimal cost.

Figure 4:
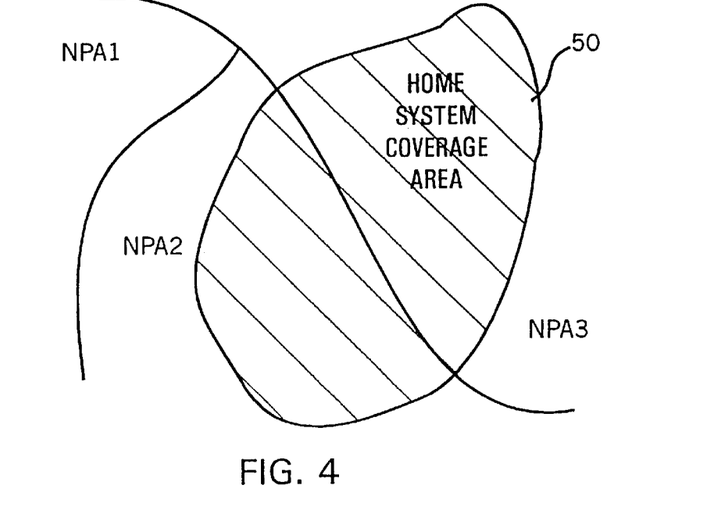
FIG. 4 shows a schematic representation of a geographical area for which the handset may perform a number analysis process.
Figure 5:
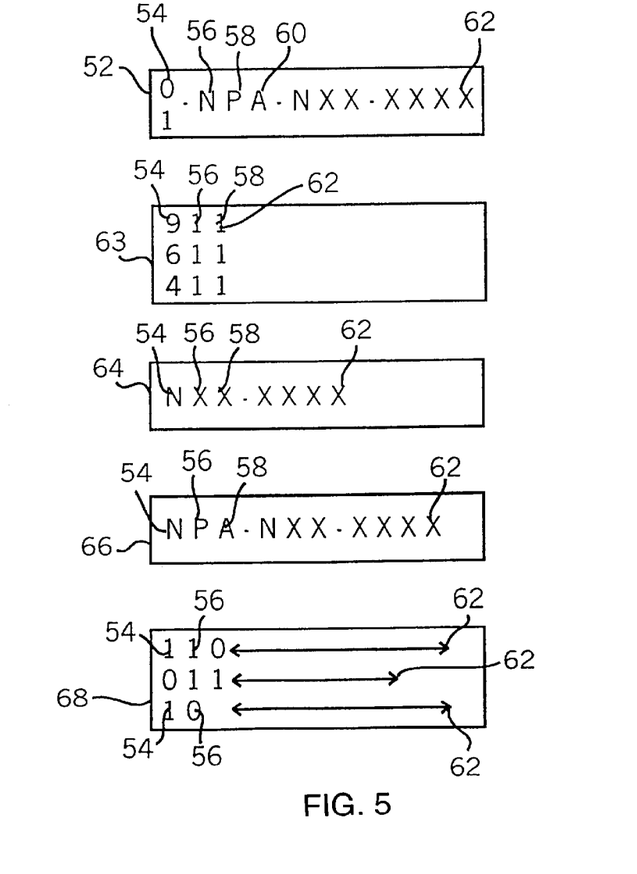
FIG. 5 shows a format diagram of various digit streams which the handset may analyze.

FIGS. 4 and 5 illustrate the significance of connected NPA codes. FIG. 4 shows a schematic representation of a geographical area for which handset 10 may perform the number analysis process. FIG. 5 shows format diagrams of various digit streams which handset 10 may analyze. FIG. 4 depicts three geographical NPA areas, labeled NPA1, NPA2, and NPA3. Generally, areas NPA1–NPA3 illustrate three distinct but contiguous areas for which three different area codes are used. A home system coverage area 50 is juxtaposed over one or more of the NPA areas, such as areas NPA2 and NPA3. Area 50 represents the area within which handset 10 is authorized to operate. Within area 50, handset 10 may operate on its "home" system. Outside of area 50, handset 10 will be "roaming". Home systems and roaming are well known concepts in the art of cellular telephony.

FIG. 5 illustrates a diverse assortment of formats for phone numbers. FIG. 5 shows earlier dialed digits to the left of later dialed digits. A format 52 represents a typical long distance format. Format 52 includes 11 digits, where a first digit 54 is either a zero or a one, a second digit 56 is a first digit of an NPA code, a third digit 58 is a second digit of an NPA code, and a fourth digit 60 is a third digit of an NPA code. The next three digits represent an NXX central office code, and the following four digits represent an XXXX station code. The eleventh digit is a final digit 62 for the phone number.

In accordance with conventional telephony terminology, the letter "N" of the NXX code may have any value in the range of 2–9 and the letter "X" of the NXX and XXXX codes may have any value in the range of 0–9. The NPA code may be either an N-0/1-X code or an NXX code. In other words the first digit of the NPA code has a value in the range of 2–9, the last digit of the NPA code has a value in the range of 0–9, and the middle digit may be restricted to being a 0 or 1 in accordance with a current standard or may be any value in the range of 0–9 in accordance with an upcoming standard.

A format 63 illustrates a three digit phone number which whose second and third digits are both ones. This format includes the ubiquitous 911 emergency number. Final digit 62 is the third digit.

Format 64 illustrates a seven digit phone number which is used for making a local, non-toll call. The first three digits 54, 56, and 58 represent the NXX central office code, and the following four digits represent the XXXX station code. Final digit 62 is the seventh digit.

In a format 66, the tenth digit is final digit 62. Format 66 uses NPA, NXX, and XXXX codes without the preceding 0/1 that format 52 uses. Format 66 is used to different degrees in different geographical areas. Typically, format 66 is used to make non-toll calls between two different NPA areas. Whether inter NPA calls are to be considered toll calls is a private arrangement of the party or parties who provide services in the two NPA areas. The preceding zero or one is often omitted so that customers clearly understand that such a call is not a toll call. This ten digit format applies to connected NPA codes. In other words, inter NPA calls between connected NPA areas use ten digit dialing while inter NPA calls between non-connected NPA areas use eleven digit dialing.

Format 68 illustrates variable length phone numbers for which the precise placement of final digit 62 is indeterminate. Generally, format 68 numbers have either a zero or one in first digit 54 and either a zero or one in second digit 56. Such numbers correspond to international calls, special signalling codes that address long distance operators, and the like.

Referring back to FIG. 4, if, for example, NPA1 and NPA2 are connected, then one may place a call from NPA2 to NPA1 using ten digit dialing, as shown in format 66 (see FIG. 5). If not connected, then one may place a call from NPA2 to NPA1 using eleven digit dialing, as shown in format 52 (see FIG. 5). Whether to use ten or eleven digit dialing depends upon the particular dialing arrangements made in the particular area where home system 50 is located.

However, through remote programming session 42 (see FIG. 3) handset 10 may obtain the intelligence required to distinguish between ten and eleven digit dialing. This intelligence is conveyed in the above-discussed connected NPA codes. Such codes identify all NPAs that are connected to the NPA(s) juxtaposed with home system coverage area 50. Moreover, remote programming session 42 may be performed as needed to track changes to connected relationships between NPAS. Such changes may be implemented in a population of handsets 10 at minimal cost and inconvenience to subscribers.

Thus, remote programming session 42 allows handsets 10 to be manufactured, inventoried, and distributed without any particular distinction concerning where handsets 10 will eventually be authorized for use. When handsets 10 are sold, the activation process may lead to the performance of remote programming session 42 so that handsets 10 may then be compatible with at least a portion of the dialing rules in effect for the handsets' home systems 50. Such programming may be later changed if the dialing rules change or if the user wishes to become activated to operate on a different home system.

While FIG. 4 illustrates connected NPA1 as being adjacent to NPA2, this is not the only arrangement. A connected NPA area, which may be reached through ten digit dialing, may, in some locations, simply overlie portions of one or more other NPA area.

Figure 6:
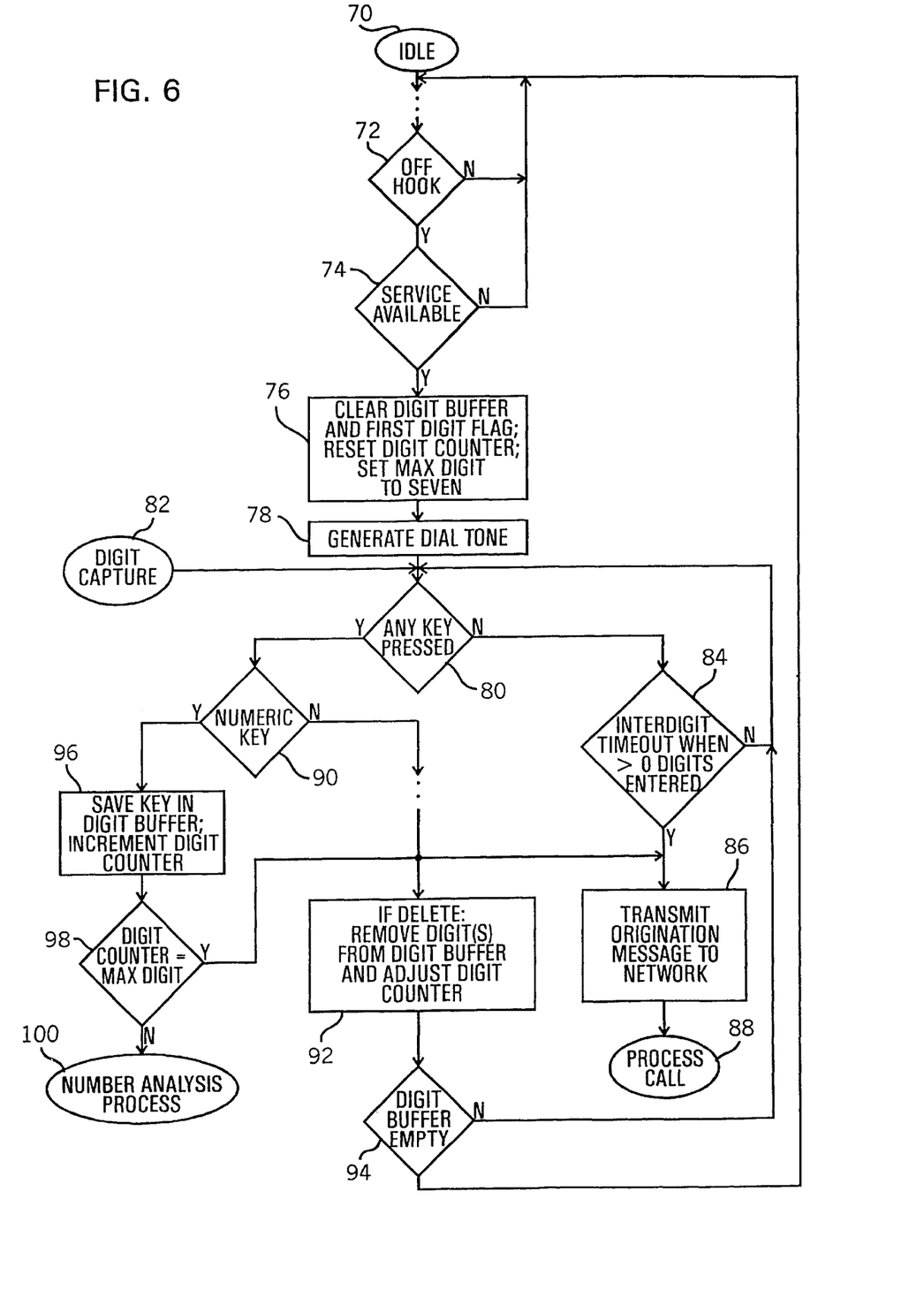
FIG. 6 shows a flow chart of an idle procedure performed by the handset.

FIG. 6 shows a flow chart of an idle procedure 70 performed by handset 10 to implement automatic dialing completion recognition. Generally, handset 10 performs procedure 70 when it is energized and is not involved in communicating with the cellular network. During idle procedure 70 handset 10 waits for an incoming call or for a user to initiate an outgoing call. As indicated by ellipsis in FIG. 6, idle procedure 70 may perform many tasks that are not relevant to automatic dialing completion recognition. Such tasks may, for example, include responding to incoming calls and monitoring for and responding to changes that may take place in service availability.

Procedure 70 performs a query task 72 to determine whether a user has manipulated a key, such as phone key 24 (see FIG. 1) of keypad 20, to signal an off-hook condition. If not, program control remains in a loop within idle procedure 70. If the off-hook condition is detected, a query task 74 determines whether service from the cellular network is still available. If service is not now available, no outgoing call can be made, and program control remains in a loop within idle procedure 70.

If task 74 determines that service is available, a task 76 clears a digit buffer, clears a first digit flag, resets a digit counter, and sets a "max digit" variable to a value of seven. The digit buffer, first digit flag, digit counter, and max digit items represent variables maintained in memory 38 (see FIG. 2). Clearing the digit buffer and resetting the digit counter initialize the digit buffer and digit counter to indicate that no digits have been entered. Clearing the first digit flag indicates that a first digit is neither a zero nor a one. The max digit variable is set to a default value of seven. If left unchanged, the seventh dialed digit will be declared final digit 62 (see FIG. 5), unless a user fails to enter digits faster than a minimum rate, which is preferably around one digit every four seconds. If four seconds transpires after a digit is entered without another digit being entered, an interdigit timer, discussed below, will declare the last-dialed digit to be final digit 62.

After task 76, a task 78 generates dial tone. Dial tone is generated by appropriately controlling DTMF tone generator 36 (see FIG. 2) to generate an audio tone having a tonal quality that approximates precision dial tone. Preferably, DTMF tone generator 36 is instructed to simultaneously generate 350 Hz and 440 Hz signals. In addition, receiver 32 (see FIG. 2) is controlled to switch the DTMF tone generator audio output to speaker 14 (see FIG. 2).

Next, a query task 80 represents an entry point to a digit capture loop 82. Task 80 determines whether any key from keypad 20 has been pressed. If no key has been pressed, a query task 84 determines whether an interdigit timeout has occurred, but only after a first digit has been entered. If no key press is detected and no interdigit timeout occurs, program control remains in digit capture loop 82 by returning to task 80. Although not shown in FIG. 6, digit capture loop 82 may include other tasks, such as continuing to check for service availability and testing for a timeout duration, the expiration of which would cause an exit from loop 82 back to the top of idle procedure 70.

Generally, handset 10 uses two parallel processes to identify final digit 62 (see FIG. 5): a number analysis process and a timing process. Regardless of the process used to identify final digit 62, when final digit 62 is identified an origination message is sent to the cellular network.

The default final digit 62 identification process is the timing process. The timing process will eventually detect final digit 62 for any dialed phone number. An interdigit timer is started or restarted for around a four second count each time a digit is entered, as discussed below. When the interdigit timer expires, as determined at task 84, handset 10 selects the timing process as the source for a decision regarding the completion of the dialing activity. At this point, program control proceeds from task 84 to a task 86. Task 86 transmits the origination message to the cellular network. In the preferred embodiment, the origination message conforms with standard cellular telephony formatting and protocol and informs the network of the called party's phone number. After task 86, handset 10 processes the call in a conventional manner, as indicated at task 88.

Thus, if the number analysis process fails to detect final digit 62 for any reason including an unusual dialing pattern, the origination message will eventually be transmitted after waiting the interdigit delay following the last digit entered. This last digit may be the fourth digit, for example, or the thirteenth digit as another example. However, the number analysis process quickly detects final digit 62 for the vast majority of calls, and the waiting period that occurs following entry of final digit 62 is avoided for the vast majority of calls.

When task 80 detects a key press, a query task 90 identifies whether the key press corresponds to a numeric key or a non-numeric key. If a numeric key is entered, then a digit of a phone number is identified, and handset 10 proceeds to analyze the number collected thus far. If a numeric key is not entered, then handset 10 may perform conventional tasks to respond to the key, as suggested by ellipsis in FIG. 6. Such tasks may include terminating the digit capture process and returning to the top of idle procedure 70 when an on-hook condition occurs. Additionally, redial or speed dial functions may be indicated. Eventually, a task 92 may be performed.

Task 92 responds to a non-numeric key which indicates a desire to delete one or more previously entered digits. Such a key may, for example, be a "clear" key. In response to a delete request, task 92 removes one or more digits from the digit buffer and appropriately adjusts the digit counter. Next, a query task 94 determines whether the digit buffer is now empty. So long as the digit buffer is not empty, program control returns to digit capture loop 82 to continue to capture digits. If the digit buffer is empty as a result of task 92, program control returns to the top of idle procedure 70. As a consequence of returning to the top of idle procedure 70, variables will be reinitialized and dial tone will be restored so long as handset 10 is still off-hook and service is still available.

When task 90 identifies the entry of a digit, a task 96 saves the identity of the keyed digit in the digit buffer and increments the digit counter. Next, a query task 98 determines whether the number analysis process has detected final digit 62. Task 98 makes its determination by evaluating whether the digit counter now equals the max digit variable. As discussed above, the max digit variable is initially set to a default value of seven to accommodate phone number format 64 (see FIG. 5), but it may change as the number analysis process analyzes the beginning digits of the phone number. In applications where handset 10 is used in connection with a PBX, the default may be set to four or five. The precise default value may be established through remote programming session 42 (see FIG. 3). If task 98 determines that the digit counter equals the max digit variable, then handset 10 selects the number analysis process to make the decision regarding when the dialing activity is complete. As a result of this selection, program control proceeds to task 86 to automatically transmit the origination message to the cellular network. When task 98 determines that the digit counter does not equal the max digit variable, program control proceeds to a number analysis process 100 to further analyze the digit.

Figure 7:
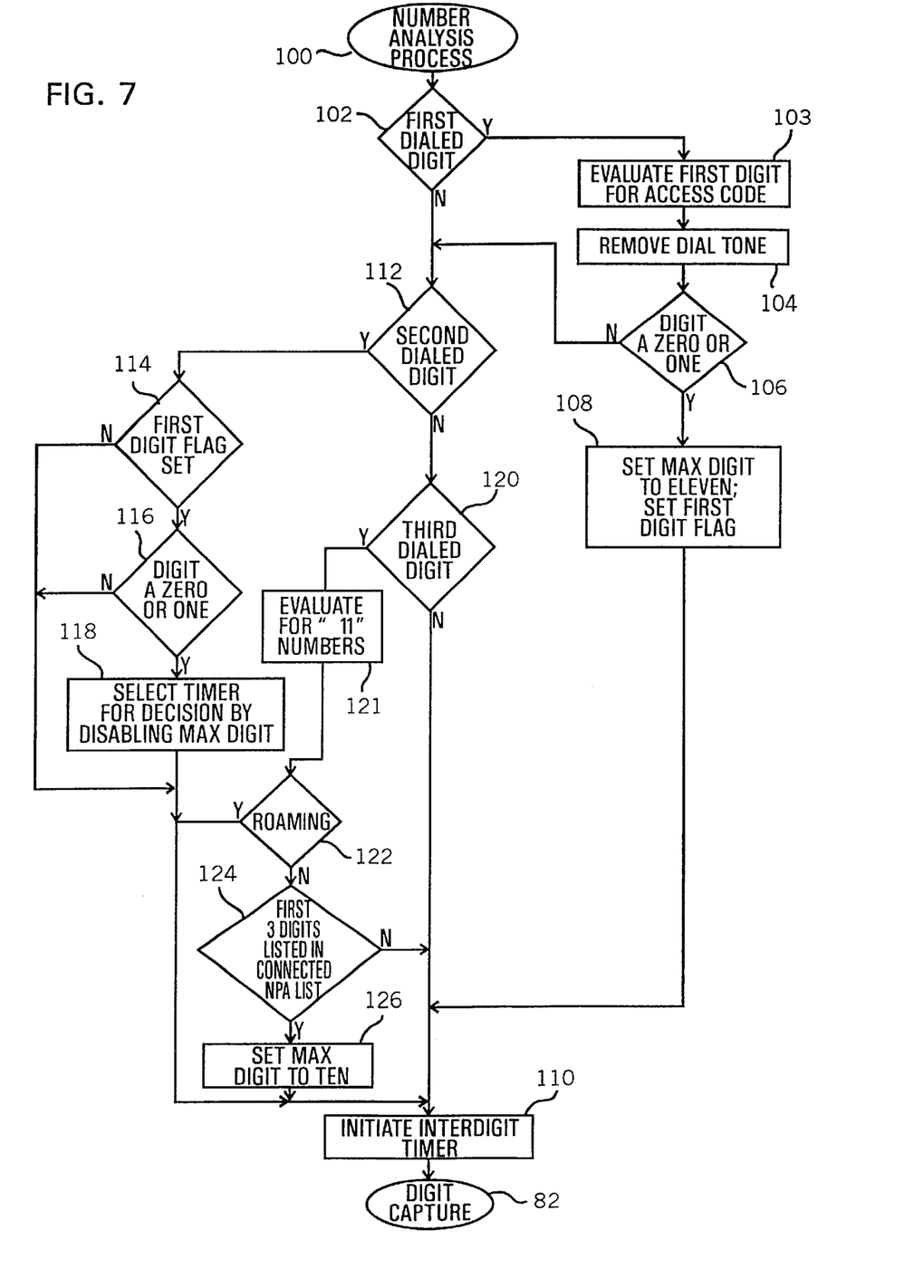
FIG. 7 shows a flow chart of the number analysis process.

FIG. 7 shows a flow chart of number analysis process 100. Process 100 performs a query task 102 to determine if the identified digit is first digit 54 (see FIG. 5). Task 102 may examine the digit counter to make its determination. If the identified digit is first digit 54, a task 103 evaluates the first digit to determine if it represents an access code. Task 103 is an optional task that is included when handset 10 is used in connection with a PBX system. An access code may be a "9", which may signify an outside, and "8" which may signify a long distance line, and the like. If an access code is detected, an appropriate response (not shown) may be to decrement the digit counter, controlling tone generator to provide audible feedback, set the max digit default to 7, and return program control to digit capture loop 82 (see FIG. 6). When dialing through a PBX, the access code is not passed to the cellular network and is not counted in detecting final digit 62.

After task 103, when a first digit is dialed task 104 preferably removes, but at least attenuates, the dial tone signal generated above in connection with task 78 (see FIG. 6).

After task 104, a query task 106 determines whether first digit 54 is a zero or a one. If the first digit is a zero or a one, then process 100 of handset 10 may conclude that the phone number being entered does not follow either of seven digit dialing format 64 or ten digit dialing format 66 (see FIG. 5). However, process 100 cannot yet distinguish between eleven digit format 52 and indeterminate length format 68 (see FIG. 5). Since the phone number might conform to eleven digit format 52, a task 108 sets the max digit variable to eleven. Since the phone number might also conform to indeterminate length format 68, task 108 sets the first digit flag to indicate that first digit 54 is either a zero or a one.

After task 108, a task 110 initiates the above-discussed interdigit timer to begin around a four second timeout. After task 110, program control returns to digit capture loop 82 (see FIG. 6) to await the next key press. If no additional key press occurs before the interdigit timer times out, handset 10 will select the timer process to provide the decision regarding the completion of the dialing activity and automatically transmit the origination message to the cellular network.

When task 102 determines that the last-entered digit was not first digit 54, a query task 112 determines whether the last-entered digit was second digit 56 (see FIG. 5). When the last-entered digit was second digit 56, a query task 114 determines whether the first digit flag is set. The first digit flag gets set when first digit 54 is a zero or a one. If the first digit flag is not set at this point in the program flow, then the phone number cannot conform to indeterminate phone number format 68 (see FIG. 5), and program control proceeds to task 110 where the interdigit timer is again initiated for another four second count.

When task 114 determines that the first digit flag was set, a query task 116 determines whether second digit 56 is a zero or a one. If second digit 56 is neither a zero nor a one, then the phone number cannot conform to indeterminate phone number format 68, and program control proceeds to task 110 where the interdigit timer is reinitiated for another four second count.

When first digit 54 is either a zero or a one and second digit 56 is either a zero or a one, program control proceeds from task 116 to a task 118. In this situation, indeterminate phone number format 68 has been detected, and the number analysis process cannot reliably detect final digit 62 due to many variations which may occur in the digit stream lengths. Task 118 forces handset 10 to select the timer process to provide the decision regarding the completion of the dialing activity. Task 118 forces handset 10 to select the timer process by disabling the max digit variable. This variable may be disabled, for example, by storing a number or code therein which will prevent task 98 (see FIG. 6) from signifying that the digit counter equals the max digit variable. After task 118, program control proceeds to task 110 where the interdigit timer is reinitated for another four second count.

When task 112 determines that the last-entered digit is not second digit 56 (see FIG. 5), a query task 120 determines whether the last-entered digit is third digit 58 (see FIG. 5). If third digit 58 is detected, a task 121 evaluates the first three digits to determine if a three digit format number 63 (see FIG. 5) has been entered. Although not shown, if a format 63 number such as 911 is entered, program control may proceed directly to task 86 to immediately transmit the origination message to the cellular network.

After task 121 verifies that no format 63 number has been entered, a query task 122 determines if handset 10 is currently roaming on a cellular system other than its home system. If handset 10 is roaming, then program control proceeds to task 110 to restart the interdigit counter and then collect additional digits. As discussed above, remote programming session 42 (see FIG. 3) programs handset 10 to detect ten digit dialing format 66 (see FIG. 5) in connection with a geographical area where handset 10 is authorized for service. When handset 10 is roaming away from this area, the ten digit dialing recognition programming may be invalid for the area where handset 10 is being used. Thus, handset 10 refrains from taking steps which can otherwise lead it to conclude that a phone number follows ten digit format 66 (see FIG. 5). If a user is dialing a ten digit phone number, the timer process will detect the completion of the dialing activity. However, if a user is roaming the number analysis process will still detect seven and eleven digit phone number formats 64 and 52, respectively.

When task 122 determines that handset 10 is not roaming, a query task 124 determines whether the first three digits are listed in the connected NPA list formed through remote programming session 42 (see FIG. 3) and stored in memory 38 (see FIG. 2). If the first three digits do not describe a connected NPA, then ten digit dialing format 66 (see FIG. 5) is not indicated, and program control proceeds to task 110 to restart the interdigit timer and then capture additional digits.

If the first three digits describe a connected NPA, then ten digit dialing format 66 is indicated and program control proceeds from task 124 to a task 126. Task 126 sets the max digit variable to the value of ten. After task 126, program control proceeds to task 110 to restart the interdigit timer and then capture additional digits. Handset 10 will instantly and automatically transmit the origination message to the cellular network upon the entry of the tenth digit unless the user stops dialing before entering the tenth digit, in which case the interdigit timer timeout will initiate the origination message.

As each additional digit is entered, program control again passes through number analysis process 100. For digits subsequent to third digit 58 (see FIG. 5), task 120 passes program control onto task 110 to restart the interdigit timer and then collect additional digits. The max digit variable remains at its default value of seven unless it was set to eleven above in task 108 in response to first digit 54, was entirely disabled in task 118 in response to second digit 56, or was set to ten in task 126 in response to third digit 58 in connection with first digit 54, second digit 56, and connected NPA programming.

In summary, the present invention provides an improved cellular radiotelephone that accommodates a call origination process which approximates the land-line call origination process. Dial tone is generated in response to an off-hook condition but is removed as soon as a first digit is dialed. For a vast majority of calls, a number analysis process immediately identifies a final phone number digit as soon as it is dialed, and an origination message is automatically transmitted to the cellular network. For a few unusual calls where the number analysis process cannot reliably detect the final phone number digit, a timer process triggers transmission of the origination message after waiting for an interdigit timeout duration of around four seconds. These few unusual calls are not distinguished from the other calls but are identified through giving the timing process a default status. The present invention may be used in any location, may be manufactured, inventoried, and distributed without any particular area-of-use distinction, and may yet perform a number analysis process which is pertinent only to a particular area. The present invention performs area-specific ten digit phone number format detection in response to connected NPA codes which are remotely programmed into the radiotelephone.

The present invention has been described above with reference to preferred embodiments. However, those skilled in the art will recognize that changes and modifications may be made in these preferred embodiments without departing from the scope of the present invention. For example, while the present invention is described in connection with a particular cellular system, the present invention may be used in connection with a wide variety of cellular systems and other radio telecommunication systems where radio devices are used to dial phone numbers. Furthermore, while the present invention has been described in connection with a specific programming flow, those skilled in the art will appreciate that a large amount of variation in configuring process tasks and in sequencing process tasks may be directed to accomplishing substantially the same functions as are described herein. These and other changes and modifications which are obvious to those skilled in the art are intended to be included within the scope of the present invention.

What is claimed is:

1. A method of operating a radiotelephone device to originate a call, said radiotelephone device being authorized to operate with a radiotelephone system that provides radiotelephone services in a first geographical NPA area, said method comprising:

establishing a data communication path between said radiotelephone device and another device;

receiving, over said data communication path, data which define a connected NPA code;

identifying the entry of a first three dialed digits and a later dialed digit, said first three digits being dialed prior to said later digit;

determining, in response to said first three digits, whether said later digit is a final digit of a phone number by evaluating said first three digits to determine whether said first three digits define said connected NPA code, said connected NPA code corresponding to a geographical NPA area which overlaps or is adjacent to said first geographical NPA area; and automatically transmitting an origination message to said radiotelephone system when said later digit is said final digit of said phone number, said origination message conveying said phone number.

2. A method as claimed in claim 1 additionally comprising:

detecting manipulation of a key which signals an off-hook condition; and generating, in response to detection of said off-hook condition, an audio tone at said radiotelephone, said audio tone having a tonal quality approximating precision dial tone.

3. A method as claimed in claim 2 additionally comprising attenuating said audio tone when a first digit is entered.

4. A method as claimed in claim 3 additionally comprising:

detecting manipulation of a key which signals an instruction to delete one or more dialed digits; and generating said audio tone in when a first dialed digit is deleted.

5. A method as claimed in claim 1 wherein said identifying activity identifies the entry of each digit of said phone number, and said method additionally comprises:

initiating a wait period in response to the entry of at least one of said digits; and performing said transmitting activity when said wait period expires.

6. A method as claimed in claim 5 wherein said initiating activity is configured so that entry of each digit following a first digit of said phone number reinitiates a wait period.

7. A method as claimed in claim 1 wherein said determining activity further comprises signifying, when said first three digits do not correspond to said connected NPA area, the final digit of said phone number as occurring upon entry of a seventh dialed digit to be conveyed to said radiotelephone system.

8. A method as claimed in claim 1 wherein:

said earlier digit is a first digit of said phone number; and said determining activity comprises signifying, when said first digit is a zero or a one, the final digit of said phone number as occurring after entry of an eleventh dialed digit to be conveyed to said radiotelephone system.

9. A method as claimed in claim 1 wherein said establishing activity establishes a wired data communication path.

10. A method as claimed in claim 1 wherein said establishing activity establishes a wireless data communication path.

* * * * *